United States Patent
Chandrasekaran et al.

(10) Patent No.: US 9,961,021 B2
(45) Date of Patent: May 1, 2018

(54) ENABLING APPLICATIONS IN A MULTI-TRANSPORT STACK ENVIRONMENT

(75) Inventors: Balachander Chandrasekaran, San Ramon, CA (US); Anantha Ramaiah, San Jose, CA (US); Manoj Kumar Pandey, Milpitas, CA (US); Siva Yaragalla, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 1428 days.

(21) Appl. No.: 13/450,744

(22) Filed: Apr. 19, 2012

(65) Prior Publication Data

US 2013/0282884 A1 Oct. 24, 2013

(51) Int. Cl.
*H04L 12/931* (2013.01)
*H04L 12/721* (2013.01)
*H04L 29/12* (2006.01)

(52) U.S. Cl.
CPC .............. *H04L 49/70* (2013.01); *H04L 45/38* (2013.01); *H04L 61/103* (2013.01)

(58) Field of Classification Search
CPC ........ H04L 49/70; H04L 45/38; H04L 61/103
USPC ........................................ 709/203, 221–223
See application file for complete search history.

(56) References Cited

U.S. PATENT DOCUMENTS

| | | | | |
|---|---|---|---|---|
| 6,249,818 B1 * | 6/2001 | Sharma | ........................ | 709/230 |
| 7,092,390 B2 * | 8/2006 | Wan | .................. | H04L 29/12009 370/352 |
| 7,185,070 B2 | 2/2007 | Paul et al. | | |
| 7,633,955 B1 * | 12/2009 | Saraiya | ................. | H04L 49/356 370/395.31 |
| 8,566,833 B1 | 10/2013 | Biswas et al. | | |
| 8,660,129 B1 * | 2/2014 | Brendel | .............. | H04L 12/4641 370/397 |
| 2002/0178268 A1 * | 11/2002 | Aiken et al. | ................... | 709/228 |
| 2007/0002761 A1 * | 1/2007 | Diamant et al. | .............. | 370/252 |
| 2007/0008884 A1 * | 1/2007 | Tang | ....................... | H04L 29/06 370/230 |
| 2007/0033260 A1 * | 2/2007 | Grouzdev et al. | ............ | 709/213 |
| 2008/0123536 A1 * | 5/2008 | Johnson | ................ | H04L 41/145 370/241 |
| 2008/0243683 A1 | 10/2008 | Patel et al. | | |
| 2010/0049885 A1 | 2/2010 | Chandra et al. | | |
| 2010/0153546 A1 * | 6/2010 | Clubb et al. | ................... | 709/224 |
| 2011/0258692 A1 | 10/2011 | Morrison et al. | | |
| 2013/0117766 A1 * | 5/2013 | Bax | ......................... | G06F 13/14 719/323 |
| 2013/0138836 A1 * | 5/2013 | Cohen | ................... | H04L 49/351 709/250 |

* cited by examiner

*Primary Examiner* — Minh Chau Nguyen
(74) *Attorney, Agent, or Firm* — P. Su

(57) ABSTRACT

In one embodiment, an apparatus includes a first transport stack, a virtual network interface controller (VNIC), and a second transport stack. The first transport stack is associated with an Internetwork Operating System (IOS), as well as with a plurality of interface-based Internet Protocol (IP) addresses and a plurality of IP addresses. The VNIC is configured to dynamically provision the plurality of interface-based IP addresses and the plurality of IP addresses. The second transport stack is associated with a kernel, and configured to communicate with a first application. The MS is configured to enable the first application to share the plurality of IP addresses and the plurality if IP addresses with a plurality of applications.

22 Claims, 7 Drawing Sheets

ENABLING APPLICATIONS IN A MULTI-TRANSPORT STACK ENVIRONMENT

TECHNICAL FIELD

The disclosure relates generally to network based services. More particularly, the disclosure relates to providing a methodology for enabling heterogeneous applications that share a unified routing infrastructure that includes Internet Protocol (IP) addresses and interfaces.

BACKGROUND

Vendors typically provide platforms which enable their applications to run on their platforms in a seamless, efficient, and secure manner. That is, a platform provided by a vendor is substantially optimized to support applications that are also provided by the vendor.

While it is possible for an application from a third party to be modified to run on a platform provided by a particular vendor, such a third party application may not generally run on the platform provided by the particular vendor in a seamless and scalable manner. Typically, in order for a third party application to run on a platform provided by a different vendor, the third party application may be modified, a virtualized environment may be used, or a solution based on network address translation (NAT) may be used. Modifying a third party application, using a virtualized environment, and/or using a NAT-based solution is often inefficient and restrictive.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
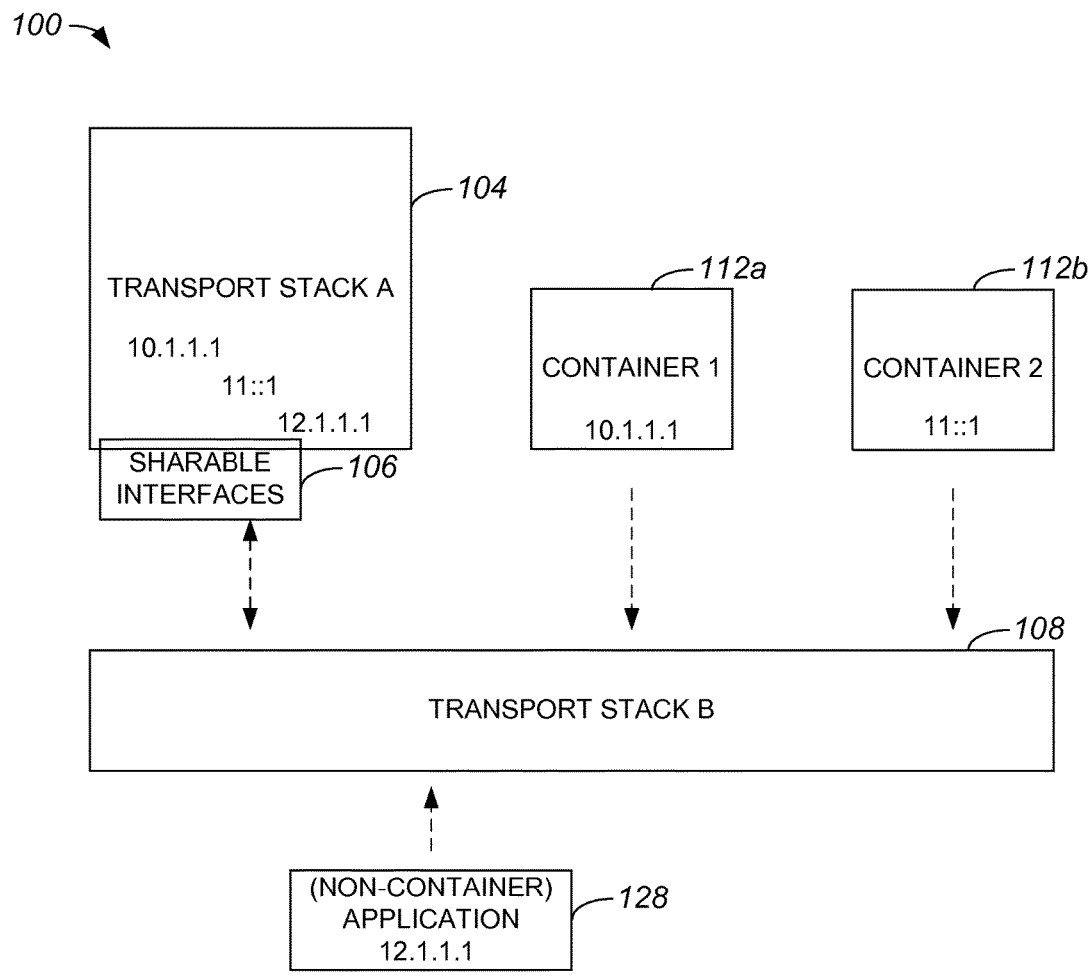
FIG. 1 is a block diagram representation of a system with multiple transport stacks in which applications may share interface-based Internet Protocol (IP) addresses in accordance with an embodiment.

According to one aspect, an apparatus includes a first transport stack, a virtual network interface controller (VNIC), and a second transport stack. The first transport stack is associated with an Internetwork Operating System (IOS), as well as with a plurality of interface-based Internet Protocol (IP) addresses and a plurality of IP addresses. The VNIC is configured to dynamically provision the plurality of interface-based IP addresses and the plurality of IP addresses. The second transport stack is associated with a kernel, e.g., a Linux kernel, and configured to communicate with a first application. The IOS is configured to enable the first application to share the plurality of IP addresses and the plurality if IP addresses with a plurality of applications.

Description

Allowing third party applications to be efficiently run on a platform or an infrastructure provided by a particular vendor, along with applications provided by the particular vendor, provides customers with a great deal of value. For example, the ability to effectively seamlessly integrate a third party application with a platform provided by a particular vendor allows a customer to readily benefit from features provided by the platform while also benefiting from functionality provided by the third party application. If a vendor does not provide an application with functionality desired by a user, providing the user with the ability to obtain a third party application with the functionality and to efficiently integrate that third party application allows the user to readily derive benefit from the functionality.

In one embodiment, an infrastructure allows applications provided by third parties to run in multiple transport stacks, namely transport stacks associated with Layer 4 of an Open Systems Interconnection (OSI) model, with substantially no modification. Multiple transport stacks may include, but are not limited to including, Linux, Internetwork Operating System (IOS), and/or other user-level transports stacks, e.g., user-level transport libraries. With respect to an infrastructure that allows applications provided by third parties to run in multiple transport stacks, applications may share interface-based Internet Protocol (IP) addresses, routing information, as well as forwarding-plane features. Forwarding-plane features may include, as for example within an infrastructure that is associated with an operating system (OS) available from Cisco Systems, Inc. of San Jose, Calif., quality of service (QoS) and security features. A suitable OS available from Cisco Systems, Inc. may include, but is not limited to including, a Cisco IOS XE that includes a feature set for routing and switching within a network. Cisco IOS XE is generally configured to manage applications, and to integrate applications outside of the Cisco IOS XE, e.g., third party applications. As will be appreciated by those skilled in the art, an OS may often include Linux as a base OS.

To enable third party applications to seamlessly integrate with a platform associated with multiple transport stacks, the third party applications may be allowed to share both interface-based IP addresses and a pool of IP addresses. For example, an IOS such as an IOSd running on top of a Linux kernel may effectively own interfaces and IP addresses that the IOSd may share with third party application such as container-based third party applications. An IOSd, in addition to performing an address resolution protocol (ARP) resolution, generally supports routing, switching, telecommunications and networking. To enable IP addresses to be shared among third party applications, virtual network interface controllers (VNICs) may be configured to dynamically provision sharable addresses. In one embodiment, a VNIC may essentially serve as an Ethernet interface that may be used by containers to send packets to a host and to receive packets from the host. Allowing interfaces and IP addresses to be shared allows for the efficient integration of services offered by an IOS, such as routing and switching, on top of a Linux kernel.

In one embodiment, not all interfaces may be shared with Linux. Interfaces may be shared dynamically such that a customer may determine which interfaces to share, and which interfaces not to share. It should be appreciated, however, that a rule-based sharing scheme may be used to determine which interfaces to share, and which interfaces not to share.

It should be appreciated that a VNIC may substantially serve as a connector. As interfaces and IP addresses may belong to an IOSd and not to a Linux stack, a VNIC, which is typically a Layer 3 (L3) tunnel device, essentially acts as a placeholder for IP addresses such that a Linux TCP/IP stack may function as if the IP addresses substantially belong to the Linux TCP/IP stack.

In order to allow sharing of IP addresses associated with a platform that has multiple transport stacks, a common flow database associated with a kernel, e.g., a Linux kernel, may contain entries for substantially all flows housed in different stacks. Stacks may communicate with such a common flow database to add records pertaining their associated flows, and such records may be added after the common flow database effectively intercepts system calls in each of the stacks.

Source addresses may be validated by applications that essentially exist on different stacks. Such validation may be accomplished using an intelligent routing infrastructure or platform. In one embodiment, a common agent may be an IOS or an independent element such as a Linux kernel loadable module (KLM) that maintains routing information. By intercepting calls in each stack that utilize routing input, routing requests may be forwarded to a common agent such as an IOS, and routing information may be returned to an intercepted call. As a result, applications that essentially exist on different stacks may take advantage of routing functionality associated with an intelligent routing infrastructure.

Common port space may be shared by applications running on multiple transport stacks associated with a platform. In one embodiment, the platform is configured to effectively prevent applications which share interfaces and/or IP addresses from using the same combination of an IP address and a port number. In one embodiment, running a service, as for example an http server, using the same IP address or interface on different stacks and/or containers is facilitated. By way of example, an IOS may run an http server on port 8, Linux may run http on port 808, and a container may run http on port 8081, while packets may be multiplexed using a flow manager to an appropriate stack.

Referring initially to FIG. 1, an overall system that includes multiple transport stacks and supports applications which may share interface-based IP addresses and/or a pool of IP addresses will be described in accordance with an embodiment. An overall system 100 includes a first transport stack 'A' 104, a second transport stack 'B' 108, and containers 112a, 112b. In one embodiment, an infrastructure associated with overall system 100 may be similar to the infrastructure associated with a Linux LXC. Containers 112a, 112b typically contain applications (not shown) that effectively run within containers 112a, 112b. While some applications (not shown) may run within containers 112a, 112b, other applications 128 may run without being included in a container. As will be appreciated by those skilled in the art, a container 112a, 112b is generally an application construct that provides a virtualized environment, and contains its own libraries and policies.

Transport stack 'A' 104, which may be associated with an IOS, is associated with sharable interfaces 106, and has a pool of IP addresses that may be shared by applications (not shown) running within containers 112a, 112b and application 128. Transport stack 'B' 108 may be associated with a kernel, e.g., a Linux kernel. Transport stack 'B' 108 serves to intercept calls, and to facilitate sharing interfaces and routing information between applications (not shown) running in containers 112a, 112b and application 128. That is, containers 112a, 112b and application 128 utilize transport stack 'B' 108

In the described embodiment, transport stack 'A' 104 is associated with a pool of IP addresses including '10.1.1.1', '11::1', and '12.1.1.1'. The pool of IP addresses may be shared among applications in containers 112a, 122b and application 128. As shown, IP address '10.1.1.1' may be substantially allocated to an application (not shown) in container 112a, IP address '11::1' may be substantially allocated to an application (not shown) in container 112b, and IP address '12.1.1.1' may be substantially allocated to application 128.

Figure 2:
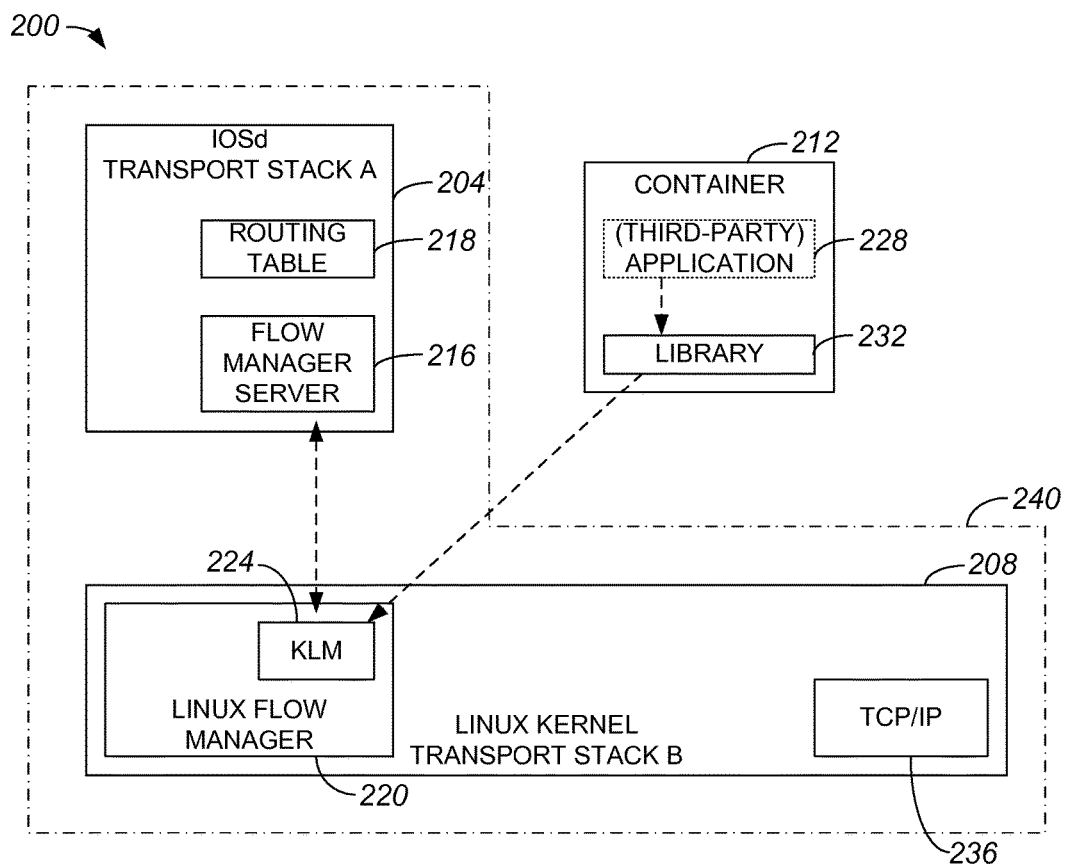
FIG. 2 is a block diagram representation of an overall system in which an application running in a container may function as if running within an IOS in accordance with an embodiment.

FIG. 2 is a block diagram representation of an overall system in which an application, e.g., an application running in a container, may function as if running within an IOS of a system that includes multiple transport stacks in accordance with an embodiment. An overall system 200 includes a first transport stack 'A' 204 and a second transport stack 'B' 208 which are associated with an environment 240, e.g., a host system or a "box." Within system 200, an application 228, which may be a third-party application, is substantially contained within a container 212. Application 228 generally accesses a library 232 associated with container 212, and runs within container 212.

Transport stack 'A' 204 is associated with an IOS, and transport stack 'B' 208 is associated with a Linux kernel. Transport stack 'A' 204 is generally configured to provide port management, and include a flow manager server 216 and a routing table 218. Transport stack 'B' 208 is configured to include a Linux flow manager 220 or, more generally, a common flow manager, that includes a kernel loadable module (KLM) 224, and is associated with a TCP/IP stack 236. KLM 224 generally includes functionality which enables application 228 to share interfaces within overall system 200, and allows application 228 to essentially run in environment 240 without being modified. When application 228 is to bind with an IP address provided by transport stack 'A' 204, application 228 may access KLM 224. KLM 224 may access routing table 218. KLM 224 may, therefore, obtain an IP address for application 228 from a pool of IP addresses maintained by transport stack 'A' 204.

Figure 3:
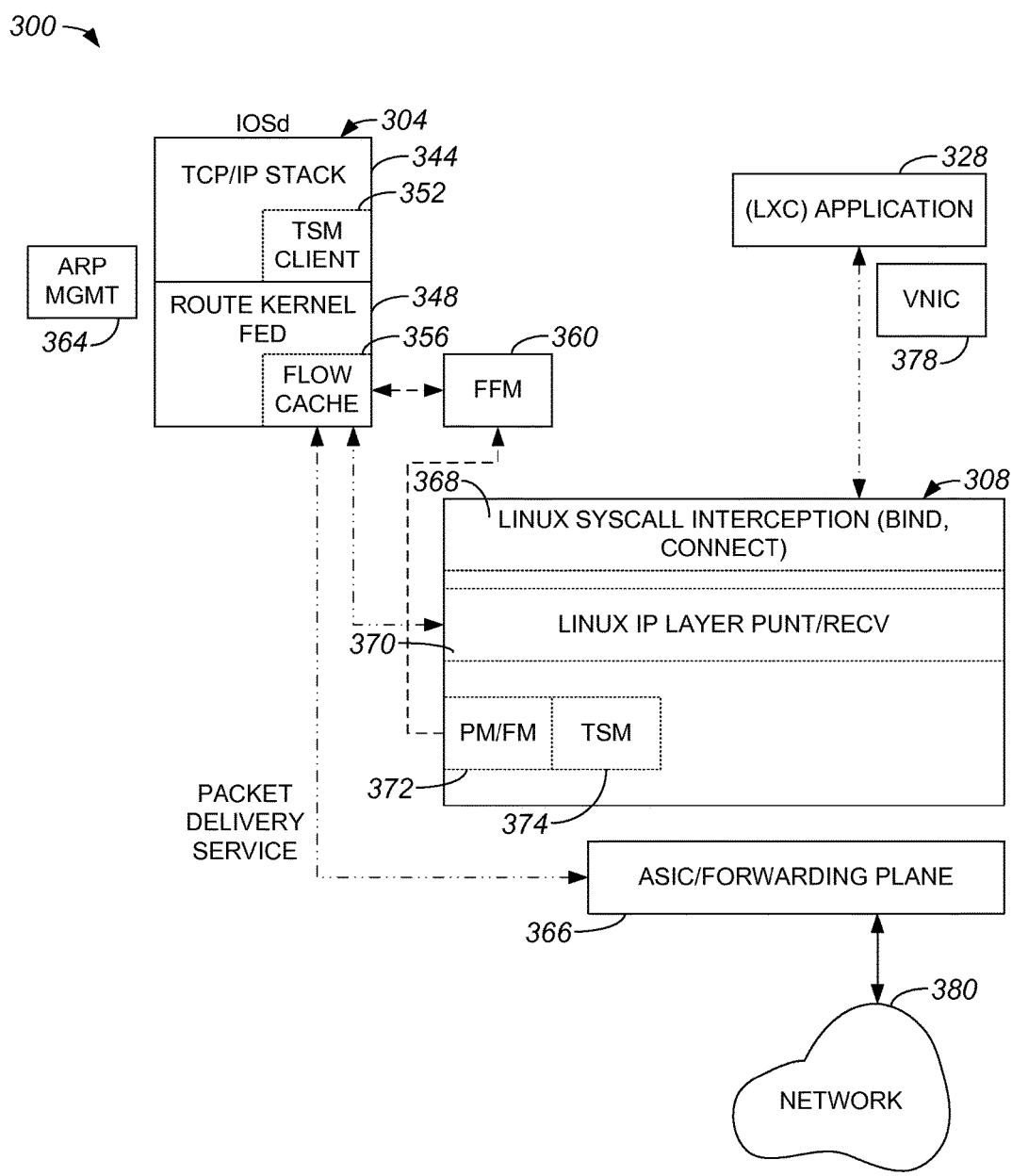
FIG. 3 is a block diagram representation of an overall system in which interfaces and/or IP addresses may be shared within a multiple transport stack environment in accordance with an embodiment.

With reference to FIG. 3, data flows and control flows within an overall system in which interfaces and/or IP addresses may be shared within a multiple transport stack environment will be described in accordance with an embodiment. An overall system 300 includes a first transport stack 304 and a second transport stack 308, as well as an application 328. Application 328 may, in one embodiment, run within a container (not shown).

Transport stack 304 includes a TCP/IP stack 344 and a route kernel forwarding engine driver (FED) 348. TCP/IP stack 344 includes a transport services module (TSM) client 352, and route kernel FED 348 includes a common flow database 356, e.g., a flow cache. TSM client 352 is configured to provide route selection and flow manager-based services, while common flow database 356 is configured to maintain substantially all data flows and control flows associated with transport stack 304. Common flow database 356 may generally be inside a Kernel, outside of the Kernel and outside of an IOSd as well, or outside of the Kernel and inside of an IOSd.

Transport stack 308, which is generally a Linux kernel, includes Linux syscall interception logic 368, Linux IP layer punt/recv logic 370, a port manager and flow manager (PM/FM) 372, and TSM logic 374. Although common flow database 356 is shown as being included in route kernel FED 348, common flow database 356 may instead be within transport stack 308. Linux syscal interception logic 368 is configured to perform bind, connect, and accept functions based on calls intercepted from application 328. Linux IP layer punt/recv logic 370 is configured to punt packets to and receive packets from a VNIC 378 that is in communication with transport stack 308. PM/FM 372 is configured to provide unified port management within a Linux TCP/IP stack, and to provide flow management for substantially punting flows to an appropriate stack instance, as will be understood by those skilled in the art.

VNIC 378 is arranged to be programmed substantially on demand, and although VNIC 378 is shown as being substantially connected to transport stack 308 or, more specifically, a Linux kernel, VNIC 378 may instead be located in transport stack 308. VNIC 378 facilitates the sharing of IP addresses by application 328.

An address resolution protocol (ARP) management module 364 is included in overall system 300, and is generally arranged to generate an ARP request in response to various events, as appropriate. It should be appreciated that ARP resolution may be performed by transport stack 308. A feature and forwarding manager (FFM) 360 is arranged to allow PM/FM to pass control information to transport stack 304, and is generally configured to accomplish control plane and data plane separation.

An application specific integrated circuit (ASIC)/forwarding plane 366 generally facilitates communications with a network 380. In general, ASIC/forwarding plane 366 includes functionally which enables packets to be processed. ASIC/forwarding plane 366 is configured to forward packets, including both transit and host-generated packets. It should be appreciated that for packets that may not be forwarded, as for example due to no adjacency information and a requirement of an ARP resolution, such packets may be punted to a control plane or a software plane. In one embodiment, ASIC/forwarding plane 366 may include a flow cache (not shown).

Within overall system 300, a control flow occurs between FFM 360 and flow cache 356, and also between PM/FM 372 and FFM 360. A data flow occurs between application 326 and transport stack 308, e.g., between application 326 and Linux syscal interception logic 368, and also between transport stack 308 and flow cache 356, e.g., between Linux IP layer punt/recv logic 370 and flow cache 356. It should be appreciated that although flow cache 356, which may be a common flow database, may be inside of a kernel as a TSM or a KLM, flow cache 356 may instead be outside of a kernel.

Figure 4:
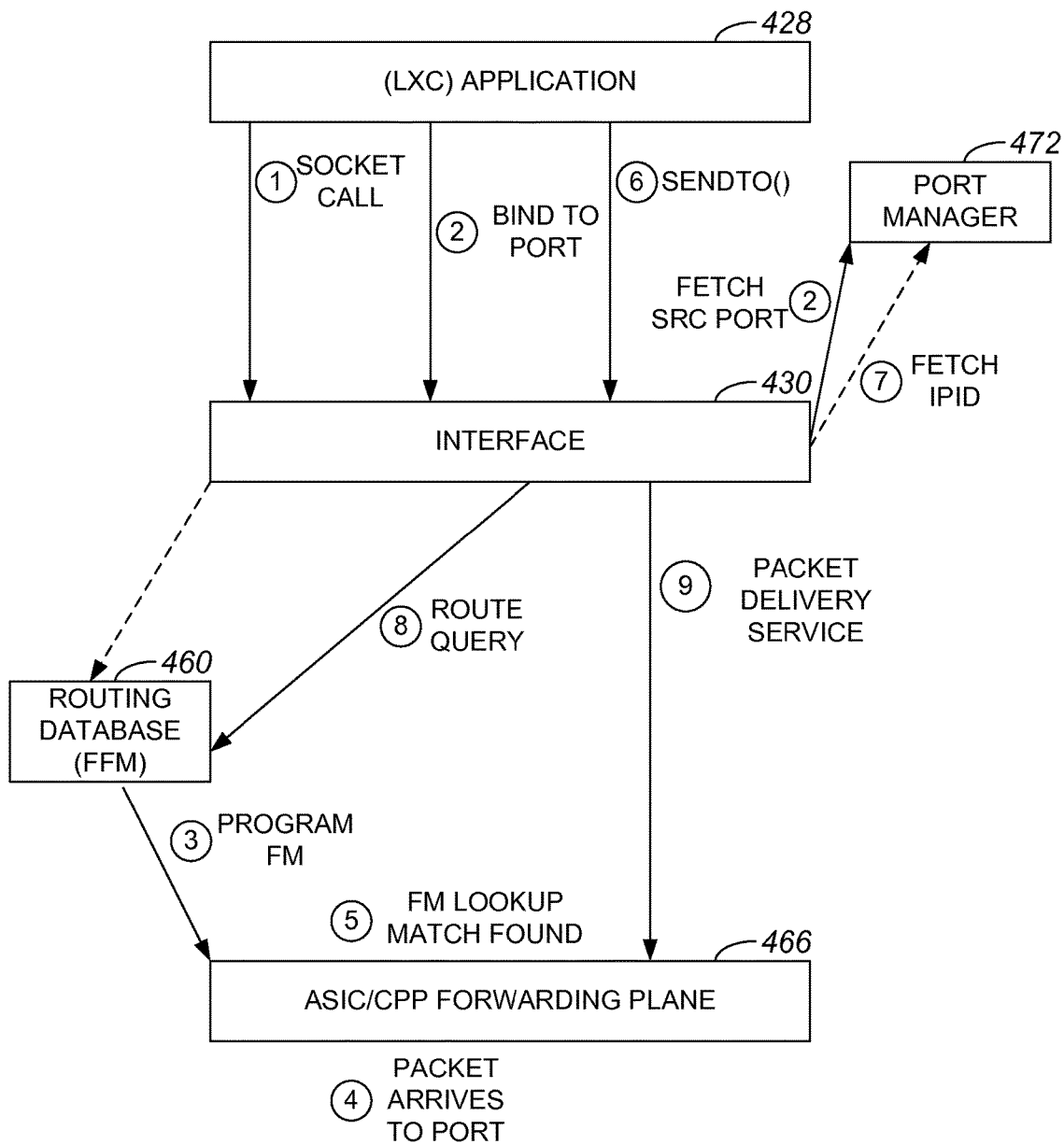
FIG. 4 is a diagrammatic representation of a packet flow in accordance with an embodiment.

FIG. 4 is a diagrammatic representation of a packet flow in accordance with an embodiment. A packet flow begins when an application 428, e.g., a third-party application running in a Linux container (LXC), makes a socket call that is obtained by an interface 430. Interface 430 is a socket interface, and is generally associated with a Linux kernel Interface 430, upon intercepting a socket call, generally causes application 428 binds to a port, as for example using a bind( ) command. At substantially the same time that application 428 binds to a port, as for example by contacting interface 430, interface 430 fetches a source (SRC) port from a port manager 472.

A routing database 460, which may be a FFM, sends a program FM command with respect to a particular port associated with an ASIC/forwarding plane 466, and a packet may arrive on the particular port. An FM lookup match may be found at which point an indication of the FM lookup match being found is provided at least to interface 430. A sendto( ) command from application 428 may be obtained by interface 428, which then fetches an IP identifier (IPID) from port manager 472, as port manager 472 is arranged to provide IPID management. Upon fetching the IPID, interface 430 sends a route query towards FFM, and provides a packet delivery service towards ASIC/forwarding plane 466. It should be appreciated that a route query may involve a route lookup based on a routing table associated with a transport stack, e.g., an IOS routing table.

Figure 5A:
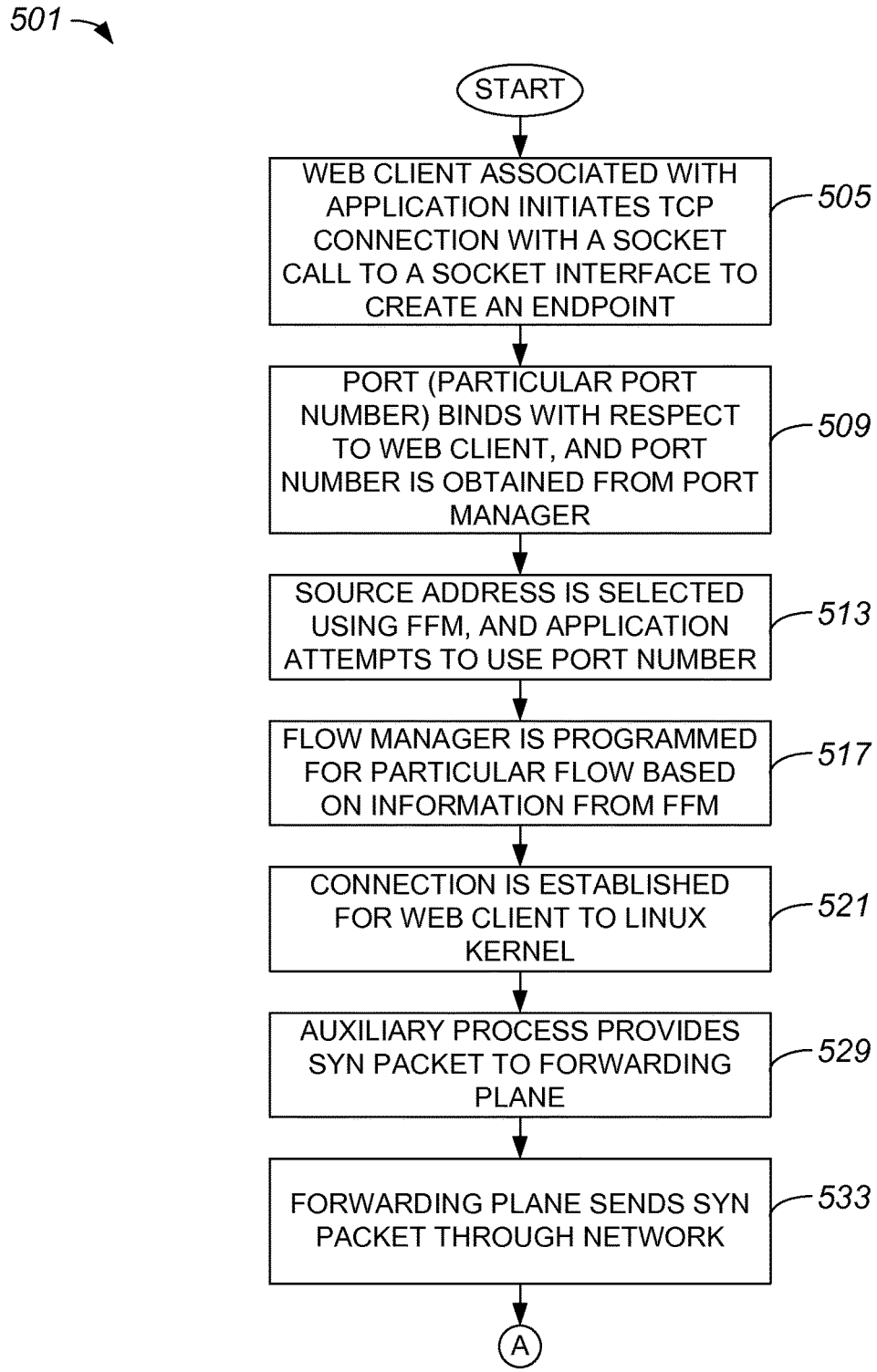
FIGS. 5A and 5B are a process flow diagram which illustrates a method of utilizing an application such that interfaces and/or IP addresses may be shared within a multiple transport stack environment in accordance with an embodiment.
Figure 5B:
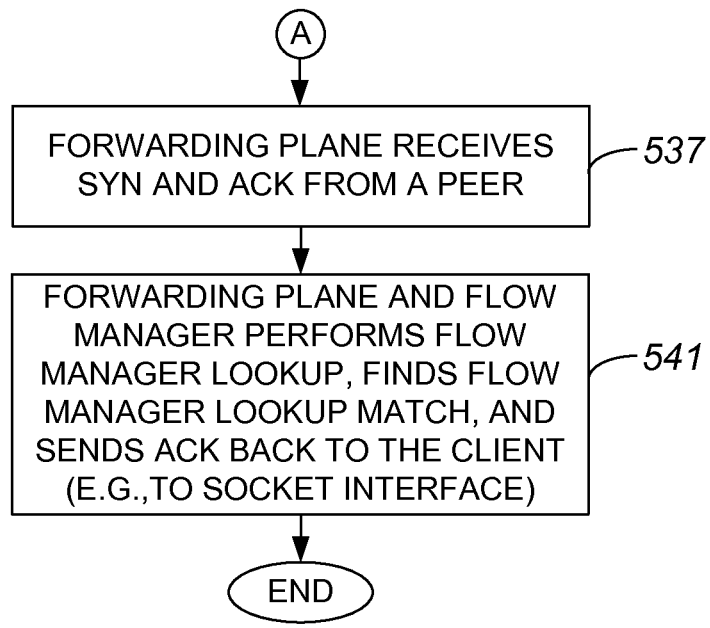

With reference to FIGS. 5A and 5B, a method of utilizing an application such that interfaces and/or IP addresses may be shared within a multiple transport stack environment will be described in accordance with an embodiment. A process 501 of utilizing an application begins at step 505 in which a web client associated with an application, e.g., an application running in a container or a third party application, initiates a TCP connection with a socket call to a socket interface such that an endpoint may be created. Once a socket call is performed, a TCP socket is opened and a port binds with respect to the web client in step 509. That is, a particular port number is effectively bound with respect to the web client associated with an application. In one embodiment, the port number may be obtained from a port manager.

In step 513, a source address is selected using an FFM, and the application attempts to use the port number. In addition to selecting a source address, a route query may be performed. Then, in step 517, a flow manager associated with a forwarding plane is programmed for a particular flow based on information obtained from the FFM.

After a source address is selected using an FFM, process flow moves to step 521 in which a connection is established, as for example using a connect( ) command, for the web client. Programming the flow manager allows a route to be followed by a packet to be identified.

In step 529, the auxiliary process provides a syn packet to a forwarding plane. The syn packet may be, in one embodiment, associated with an incoming SYN request that is delivered to a Linux TCP/IP stack through a VNIC from the forwarding plane and associated flow manager. Upon obtaining the syn packet, the forwarding plane and associated flow manager may provide the syn packet in step 533 through a network. Once the syn packet is forwarded, the forwarding plane may receive the syn packet and an acknowledgement from a peer in step 537. It should be understood that once the peer sends an acknowledgement, a connection is established with the peer. Then, in step 541, the forwarding plane and associated flow manager performs a flow manager lookup, obtains a match as a result of the flow manager lookup, and sends an acknowledgement to the socket interface. Once the acknowledgement is sent to the socket interface, data exchange may occur, and the process of utilizing an application is completed.

Figure 6:
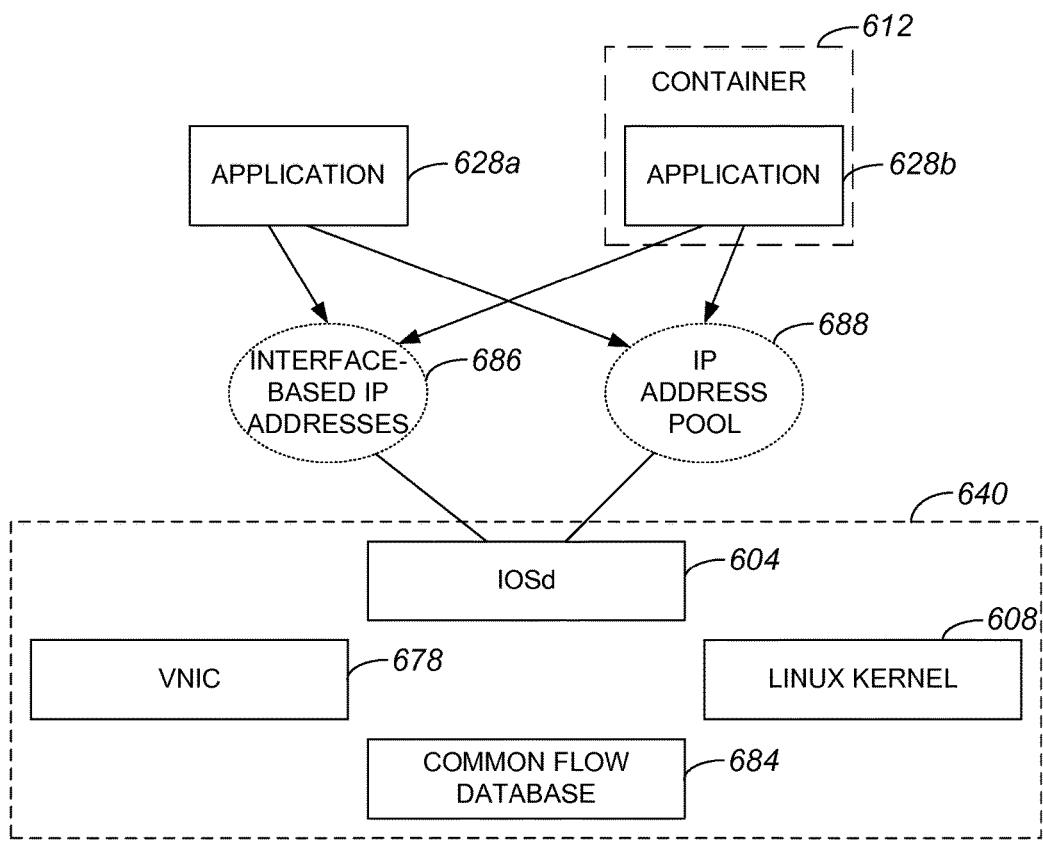
FIG. 6 is a diagrammatic representation of a system in which applications and applications running within containers may share IP addresses in accordance with an embodiment.

FIG. 6 is a diagrammatic representation of a system in which applications and applications running within containers may share IP addresses in accordance with an embodiment. An environment 640 that includes an IOS 604, a Linux kernel 608, a common flow database 684, and at least one VNIC 678. As previously mentioned, VNIC 678 may be connected to Linux kernel 608, as shown, or VNIC 678 may be included in Linux kernel 608. Common flow database 684 contains entries for substantially all flows associated with environment 640. In one embodiment, common flow database 684 is populated by intercepting system calls including, but not limited to including, bind ( ), connect ( ), and accept ( ) in IOS 604 and/or Linux kernel 608. By way of example, an interception arrangement running on Linux kernel 608 may intercept the system calls to obtain information that is used to maintain entries in common flow database 684. IOS 604 and Linux kernel 608 or, more generally, stacks within environment 640, use information stored in common flow database 684 to maintain flow records on IOS 604 and Linux kernel 608.

Application 628a which may run without being included in a container, and application 628b which may run in a container 612, may share interface-based IP addresses 686 and an IP address pool 688. It should be appreciated that application 628b may also have a set of substantially private IP addresses (not shown) for internal use within container 612.

Although only a few embodiments have been described in this disclosure, it should be understood that the disclosure may be embodied in many other specific forms without departing from the spirit or the scope of the present disclosure. By way of example, the functionality associated with enabling third-party applications to run in a multiple transport stack environment has been described as being provided in an OS such as a Cisco IOS XE available from Cisco Systems, Inc. The functionality associated with enabling third-party applications to run in a multiple transport stack environment, however, is not limited to being provided in an OS such as the Cisco IOS XE. In other words, the ability to allow third-party applications to run in a multiple transport stack environment may be incorporated in any suitable platform.

Shared IP addresses may be tied to a single virtual router function (VRF), in one embodiment. For example, an owner of IP addresses, e.g., an IOSd, may enforce VRF such that application may share IP addresses that belong to the VRF. Alternatively, it should be appreciated that applications may instead share IP addresses that belong to different VRFs.

Third party applications may communicate throughout a network without accessing the transport stacks described above. For example, third party applications may communicate with each other. To facilitate the ability for third party applications running in a container to communicate, the container may be arranged substantially behind a lightweight network address translation (NAT).

Various configurations may be implemented with respect to a Linux kernel to facilitate the sharing of IP addresses by different applications. The various configurations may include, but are not limited to including, disabling address validation, programming shared IP addresses into a Linux IP table, disabling routing and ARP lookup in the Linux kernel, and/or implementing a static route to punt substantially all traffic to a VNIC that sends the traffic to a forwarding plane.

While a Linux kernel has generally been described, it should be appreciated that a kernel is not limited to being a Linux kernel. That is, a kernel may be any suitable kernel of an operating system, e.g., a kernel that allows applications to effectively be connected to hardware of a computing system, without departing from the spirit or the scope of the disclosure.

The embodiments may be implemented as hardware and/or software logic embodied in a tangible medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. By way of example, steps associated with the methods of the present invention may vary depending on whether an application performs a passive open or an active open. Therefore, the present examples are to be considered as illustrative and not restrictive, and the examples is not to be limited to the details given herein, but may be modified within the scope of the appended claims.

What is claimed is:

1. An apparatus comprising:
a first transport stack, the first transport stack being associated with an Internetwork Operating System (IOS), the first transport stack being associated with a plurality of interface-based Internet Protocol (IP) addresses and a plurality of IP addresses;
a virtual network interface controller (VNIC), wherein the VNIC dynamically provisions the plurality of interface-based IP addresses and the plurality of IP addresses, and wherein the VNIC is an Ethernet interface arranged to send and to receive packets; and
a second transport stack, the second transport stack being associated with a kernel, wherein the second transport stack communicates with a first application, and wherein the IOS is configured to enable the first application to share the plurality of interface-based IP addresses and the plurality of IP addresses with a plurality of applications.

2. The apparatus of claim 1 further including:
a common flow database, wherein the common flow database contains at least one entry for at least one flow, and wherein the flow is associated with at least one selected from a group including the first transport stack and the second transport stack.

3. The apparatus of claim 2 wherein the first transport stack and the second transport stack are arranged to communicate with the common flow database to cause at least one flow record to be updated.

4. The apparatus of claim 2 wherein the second transport stack includes an interception arrangement, wherein the interception arrangement intercepts system calls to obtain information used to update the at least one entry.

5. The apparatus of claim 2 wherein the at least one entry includes a first entry associated with the first transport stack and a second entry associated with the second transport stack, and wherein the common flow database intercepts system calls associated with the first transport stack and intercepts system calls associated with the second transport stack.

6. The apparatus of claim 1 wherein the kernel is a Linux kernel.

7. The apparatus of claim 1 wherein the first application runs in a container, wherein the container and the first application utilize the second transport stack, the first application being arranged to access a library associated with the container.

8. The apparatus of claim 1 wherein the second transport stack includes an interception arrangement, wherein the interception arrangement intercepts a system call associated with a routing request from a source, the second transport stack further being arranged to forward the routing request to the IOS, to obtain routing information through the IOS, and to provide the routing information to the source.

9. A method comprising:
intercepting at least one system call from an application, the at least one system call being obtained on a first stack of a plurality of stacks associated with an environment;
programming a flow cache of the environment using information included in the intercepted system call, wherein the flow cache is configured to maintain flow information for a plurality of flows associated with the environment; and
performing a source address selection using a routing table associated with a second stack of the plurality of stacks, wherein the application is arranged to share a pool of Internet Protocol (IP) addresses associated with the second stack.

10. The method of claim 8 wherein the first stack is associated with a Linux kernel and the second stack is associated with an Internetwork Operating System (IOS), and wherein the Linux kernel includes a Linux IP layer, the Linux IP layer being configured to punt packets to a virtual network interface controller (VNIC), the VNIC being arranged to dynamically provision at least one IP address of the pool of IP addresses.

11. The method of claim 10 wherein the Linux IP layer is further configured to receive packets from the VNIC.

12. The method of claim 9 wherein the application runs in a container, wherein the container and the application utilize the second stack, the first application being arrange to access a library associated with the container.

13. The method of claim 9 further including:
performing an address resolution protocol (ARP) process, wherein the ARP process is performed with respect to the second stack.

14. A tangible, non-transitory computer-readable medium comprising computer program code, the computer program code, when executed, configured to:
intercept at least one system call from an application, the at least one system call being obtained on a first stack of a plurality of stacks associated with an environment;
program a flow cache of the environment using information included in the intercepted system call, wherein the flow cache is configured to maintain flow information for a plurality of flows associated with the environment; and
perform a source address selection using a routing table associated with a second stack of the plurality of stacks, wherein the application is arranged to share a pool of Internet Protocol (IP) addresses associated with the second stack.

15. The computer-readable medium of claim 14 wherein the first stack is associated with a Linux kernel and the second stack is associated with an Internetwork Operating System (IOS), and wherein the Linux kernel includes a Linux IP layer, the Linux IP layer being configured to punt packets to a virtual network interface controller (VNIC), the VNIC being arranged to dynamically provision at least one IP address of the pool of IP addresses.

16. The computer-readable medium of claim 15 wherein the Linux IP layer is further configured to receive packets from the VNIC.

17. The computer-readable medium of claim 14 wherein the application runs in a container.

18. The computer-readable medium of claim 14 further including:
perform an address resolution protocol (ARP) process, wherein the ARP process is performed with respect to the second stack.

19. An apparatus comprising:
a plurality of stacks associated with an environment;
logic embodied in a computer-readable medium and operable to intercept at least one system call from an application, the at least one system call being obtained on a first stack of the plurality of stacks, the first stack being configured to provide a common flow manager;
logic embodied in the computer-readable medium and operable to program a flow cache of the environment using information included in the intercepted system call, wherein the flow cache is configured to maintain flow information for a plurality of flows associated with the environment;
logic operable to perform a source address selection using a routing table associated with a second stack of the plurality of stacks, the second stack being configured to provide port management, wherein the application is arranged to share a pool of Internet Protocol (IP) addresses associated with the second stack; and
a computer-readable medium that stores the logic.

20. The apparatus of claim 19 wherein the first stack is associated with a Linux kernel and the second stack is associated with an Internetwork Operating System (IOS), and wherein the Linux kernel includes a Linux IP layer, the Linux IP layer being configured to punt packets to a virtual network interface controller (VNIC), the VNIC being arranged to dynamically provision at least one IP address of the pool of IP addresses.

21. The apparatus of claim 20 wherein the application runs within a container and wherein the Linux IP layer is further configured to receive packets from the VNIC, the VNIC being an Ethernet interface used by the container used to send the packets.

22. The apparatus of claim 19 wherein the application runs in a container, and wherein the application has at least one substantially private IP address for internal use within the container.

* * * * *